Aug. 18, 1953 — A. RAPPL — 2,649,332
WINDSHIELD CLEARING SYSTEM
Filed April 28, 1948

INVENTOR.
Anton Rappl
BY Beau, Brooks, Buckley & Beau,
ATTORNEYS.

Patented Aug. 18, 1953

2,649,332

UNITED STATES PATENT OFFICE 2,649,332

WINDSHIELD CLEARING SYSTEM

Anton Rappl, Eggertsville, N. Y., assignor to Trico Products Corporation, Buffalo, N. Y.

Application April 28, 1948, Serial No. 23,778

19 Claims. (Cl. 299—58)

1

This invention relates to the windshield washing art and has particular reference to an apparatus for discharging a liquid solvent onto the windshield of a motor vehicle in conjunction with a moving wiper toward the maintenance of a clear field of vision for the motorist.

The washer now on the market necessitates the motorist opening a communication with the intake manifold to actuate a pump on its liquid intaking stroke and then closing off the communication to permit the pump delivering the liquid onto the windshield. Since the manifold influence is fluctuating in character the motorist will hold the control valve opened for a long period of time to insure a full intake stroke of the pump, and because of the uncertainty of the situation he will frequently and usually hold the valve opened unnecessarily for a prolonged interval, all of which diverts his attention from the safe driving of the vehicle.

The object of the present invention is to simplify the windshield washing operation, and further to detract the motorist's attention to a minimum whereby he may direct his efforts to the proper steering and control of the vehicle.

Again, the invention has for its object to provide an apparatus which will quickly respond to the demand when made.

Furthermore, the invention will be found in a unique and novel arrangement which will effect a discharge of the liquid solvent independent of the release of the control by the motorist and thereby will apprise him of the fact so that he may redirect his attention wholly to the remaining factors necessary for the safe maneuvering of the vehicle.

The foregoing and other objects will manifest themselves as the following description progresses, reference being made to the accompanying drawing wherein Fig. 1 is a schematic view of an automobile washer system embodying the present invention;

Figure 1:
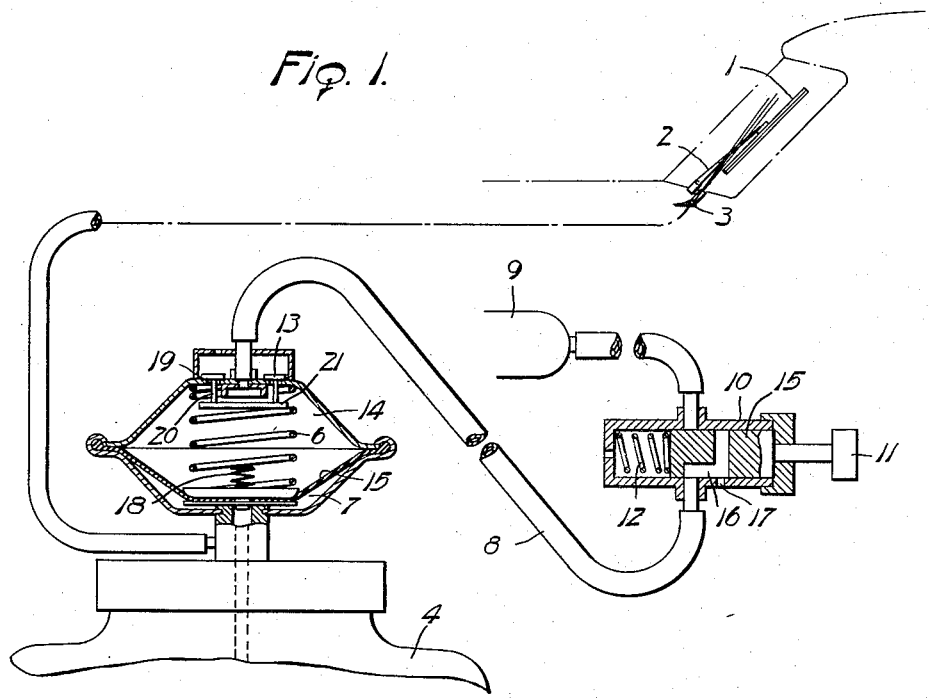

Referring more particularly to the drawing, the numeral 1 designates a wiping blade which is oscillated by an arm 2 on the windshield surface that is being sprayed with a liquid solvent from a nozzle 3. The solvent is drawn from a reservoir or container 4 and forcibly ejected through the nozzle by means of a pump having an intake stroke and a delivery stroke.

According to the present invention means are

2 provided to function at the end of the intaking stroke for initiating the delivery stroke and removing it from the control of the motorist. To this end, the pump depicted in Fig. 1 has a fluid displacing member 15 in the form of a diaphragm operating against the tension of a spring 6 to intake a quantity of the solvent in the liquid chamber 7 when the suction line 8 from the manifold 9 is opened by a control 10. The valve button 11 is held depressed against the action of a return spring 12 until the diaphragm 5 completes its intaking stroke at which time a venting valve 13 is opened automatically to vent the suction chamber 14 to the atmosphere and thereby bring the spring 6 into play for depressing the diaphragm to eject the charge of liquid regardless of the fact that the motorist might continue to hold the valve button depressed. Obviously, when he sees the solvent flowing from the nozzle he will release the control 10 so that the spring 12 may act to restore the valve 15 to its normal position in which the suction chamber is in open communication with the atmosphere through its recess 16 and a port 17. As the diaphragm approaches the end of its intaking stroke a spring 18 is loaded or compressed between the diaphragm and the venting valve to rapidly unseat the latter after the air seal is once broken. The venting valve 13 may be in the form of a disk and arranged to seat over a port 19, with its stem 20 depending through the port and carrying a valve plate 21 for engaging a seat 8' when actuated by the spring 18. This valving action will serve to close the suction passage 8. One or more valves may be attached to the plate. The inlet and outlet passages of the pump will be provided with the usual valve means (not shown) to insure unidirectional flow therethrough.

Figure 2:
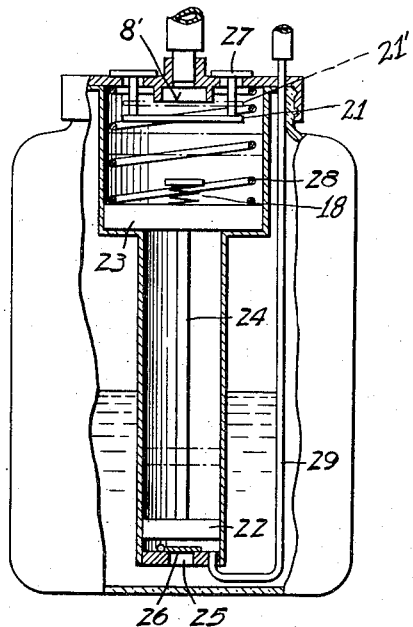
Fig. 2 is a vertical sectional view through a modified apparatus.

In the embodiment of Fig. 2, the liquid displacing diaphragm has been replaced by a differential piston having a liquid displacing member 22 and a larger motor piston 23 joined thereto by a connecting rod 24 for movement as a unit. By reason of the larger motor piston, and a larger intake opening 25 which is normally closed by a valve 26, the differential piston will respond quickly to the suction influence when the valve button 11 is depressed. As in the previously described embodiment, the upward travel of the liquid displacing member 22, 23, 24, will terminally effect an unseating of the vent valve 27 after first loading the piston carried spring similar to the spring 18 and free the spring 28 to depress the displacing member and force the liquid charge out to the nozzle through the delivery pipe 29. Concurrent with the opening of the vent valve, the suction passage 8 will be closed by the valve plate 21 engaging its seat 8', as indicated by the broken lines 21'.

Figure 3:
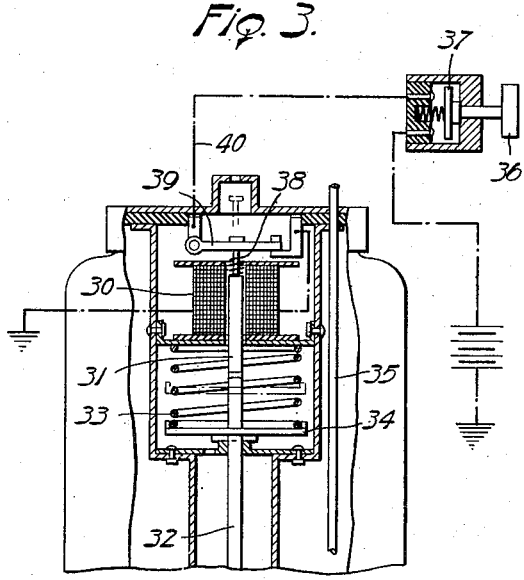
Fig. 3 is still a further modification incorporating the present inventive concept.

The pump illustrated in Fig. 3 is electrically operated, but functions in a like manner as the two pneumatic pumps just described. In this embodiment a solenoid 30 has its armature 31 connected by a rod 32 to a piston or plunger similar to piston 22. A spring 33 resting on a shelf 34 serves to move the piston on its delivery stroke to eject the liquid through the delivery pipe 35. For intaking the liquid charge, a button 36 of a control or switch 37 is depressed to energize the solenoid for attracting its armature and lifting the connected piston. As the armature approaches its upper limit of movement, a spring 38 will compress against a switch arm 39 and eventually open the solenoid circuit 40.

In all forms of the invention the delivery stroke of the pump is initiated independently of any manipulation of the control by the motorist. The venting valves 13 and 27 and the switch 39 are rendered inoperative by the spring 18, 38 as the pump displacing member completes the end of one stroke. This action serves to interrupt the power for such intaking stroke and thereby to free the spring 6, 28, 33 to actuate the pump on the reverse stroke. The valves 13 and 27 and the switch 39 will each thereby serve as a power interrupting device and to thereby free the spring so that it may perform the return stroke. The liquid is discharged quickly onto the windshield and will therefore apprise him of the fact that the purpose has been accomplished and that he should therefore release the control button. Obviously, the control may be placed for actuation by the foot which control is included within the use of the term manual herein.

The foregoing description has been given in detail for clearness and without thought of limitation since the inventive principles involved are capable of assuming other physical embodiments without departing from the spirit of the invention and the scope of the appended claims.

What is claimed is:

1. A pump having a fluid displacing member with an intake stroke and a delivery stroke, power means acting thereon to effect one stroke, power means operable to effect the other stroke of said displacing member, and power interrupting means operable by the displacing member during its other stroke for rendering said second power means inoperative and automatically bringing the first power means into operation.

2. A pump having a fluid displacing member with an intake stroke and a delivery stroke, energy storing means acting constantly on said member to effect one stroke, power means operable in counteraction of said first means for effecting the other stroke of said displacing member, and power interrupting means operable by the displacing member during its other stroke to render the power means inoperative to enable the first means to become operative.

3. A windshield washer mechanism for displacing liquid from a reservoir and discharging it onto a windshield surface, comprising a pump having a fluid displacing member with an intake stroke and a delivery stroke, energy storing means acting constantly upon said member for effecting one stroke, power means operable to effect the other stroke of said displacing member in counteraction of said first means, and means operable by the displacing member during its other stroke for freeing said displacing member from said power means to enable the first means becoming operative.

4. A windshield washer mechanism for displacing liquid from a reservoir and discharging it onto a windshield surface, comprising a pump having a fluid displacing member with an intake stroke and a delivery stroke, energy storing means acting constantly upon said member for effecting one stroke, power means operable to effect the other stroke of said displacing member in counteraction of said first means, means operable by the displacing member during its other stroke for freeing said displacing member from said power means to enable the first means becoming operative, and a manual control for rendering said power means operative.

5. A windshield washer mechanism for displacing liquid from a reservoir and discharging it onto a windshield surface, comprising a pump having a fluid displacing member with an intake stroke and a delivery stroke, energy storing means acting constantly upon said member for effecting one stroke, power means operable to effect the other stroke of said displacing member in counteraction of said first means, means operable by the displacing member during its other stroke for freeing said displacing member from said power means to enable the first means becoming operative, said power means being pneumatically operable and said freeing means venting the operating pressure in the pump to the atmosphere and a control valve for opening the operating pressure to the pump to effect such intake stroke.

6. A windshield washer mechanism for displacing liquid from a reservoir and discharging it onto a windshield surface, comprising a pump having a fluid diplcing member with an intake stroke and a delivery stroke, energy storing means acting constantly upon said member for effecting one stroke, power means operable to effect the other stroke of said displacing member in counteraction of said first means, means operable by the displacing member at the end of its other stroke for freeing said displacing member from said power means to enable the first means becoming operative, said power means being electrically actuated and said freeing means being in the form of a switch adapted to be actuated by the displacing member to open the circuit, and a control switch for closing the circuit to effect operation of said power means.

7. A windshield washer mechanism for displacing liquid from a reservoir and discharging it onto a windshield surface, comprising a pump having a fluid displacing member with an intake stroke and a delivery stroke, energy storing means acting constantly upon said member for effecting one stroke, power means operable to effect the other stroke of said displacing member in counteraction of said first means, and means operable by the displacing member at the end of its other stroke for freeing said displacing member from said power means to enable the first means becoming operative, said power means comprising a pneumatically operated piston connected to the displacing member and being of relatively greater displacement.

8. A windshield washer mechanism for displacing liquid from a reservoir and discharging it onto a windshield surface, comprising a pump having a fluid displacing member with an intake stroke and a delivery stroke, energy storing means acting constantly upon said member for effecting one stroke, power means operable to effect the other stroke of said displacing member in counteraction of said first means, and means operable by the displacing member at the end of its other stroke for freeing said displacing member from said power means to enable the first means becoming operative, said power means comprising a pneumatically operated piston connected to the displacing member and being of relatively larger cross sectional area, said pump having an inlet and a relatively smaller outlet.

9. A washer for the windshields of motor vehicles, comprising a pump provided with a fluid displacing member having an intake stroke and a delivery stroke, a fluid pressure motor having a chamber and a pressure responsive member therein with a power stroke and a return stroke, a power spring biased by the responsive member during its power stroke for storing up energy for subsequent expenditure in effecting one stroke of the displacing member, said responsive member being operatively connected to the displacing member and operating on the power stroke to move the displacing member on its other stroke against the urge of said power spring, said chamber having a pressure supply port, and a normally closed venting valve for the chamber operable by the pressure responsive member toward the end of its power stroke to dissipate the chamber pressure and thereby to free the displacing member for actuation by said power spring.

10. A washer for the windshields of motor vehicles, comprising a pump provided with a fluid displacing member having an intake stroke and a delivery stroke, a fluid pressure motor having a chamber and a pressure responsive member therein with a power stroke and a return stroke, a power spring biased by the responsive member during its power stroke for storing up energy for subsequent expenditure in effecting one stroke of the displacing member, said responsive member being operatively connected to the displacing member and operating on the power stroke to move the displacing member on its other stroke against the urge of said power spring, said chamber having a pressure supply port, a normally closed venting valve for the chamber operable by the pressure responsive member toward the end of its power stroke to dissipate the chamber pressure and thereby to free the displacing member for actuation by said power spring, and a normally open pressure valve operable by the responsive member concurrently with the venting operation to close the chamber supply port.

11. A washer for the windshields of motor vehicles, comprising a combined pump and fluid pressure motor, the latter having a chamber and a pressure responsive member therein with a power stroke and a return stroke, the pump having an intake stroke and a delivery stroke, a power spring biased by the responsive member during its power stroke for storing up energy for subsequent expenditure in effecting one stroke of the pump, said chamber having a pressure supply port, and a normally closed venting valve for the chamber operable by the pressure responsive member toward the end of its power stroke to dissipate the chamber pressure and thereby to free the power spring.

12. A washer for the windshields of motor vehicles, comprising a combined pump and fluid pressure motor, the latter having a chamber and a pressure responsive member therein with a power stroke and a return stroke, the pump having an intake stroke and a delivery stroke, a power spring biased by the responsive member during its power stroke for storing up energy for subsequent expenditure in effecting one stroke of the pump, said chamber having a pressure supply port, a normally closed venting valve for the chamber operable by the pressure responsive member toward the end of its power stroke to dissipate the chamber pressure and thereby to free the power spring, and a normally open pressure valve operable by the responsive member concurrently with the venting operation to close the chamber supply port.

13. A windshield washer for motor vehicles, comprising a motor-pump unit having a liquid displacing member with an intake stroke and a delivery stroke, a spring biasing the liquid displacing member to move it throughout one stroke, said unit including power actuated means to move the liquid displacing member on its other stroke against the urge of the spring, and a power interrupting device operable by the power actuated means during the other stroke of the liquid displacing member for interrupting the application of power to said means to enable the functioning of said spring.

14. A washer for the windshields of motor vehicles, comprising a pump provided with a fluid displacing member having an intake stroke and a delivery stroke, a fluid pressure motor having a chamber and a pressure responsive member therein with a power stroke and a return stroke, a power spring biased by the responsive member during its power stroke for storing up energy for subsequent expenditure in effecting one stroke of the displacing member, said responsive member being operatively connected to the displacing member and operating on the power stroke to move the displacing member on its other stroke against the urge of said power spring, said chamber having a pressure supply port, a normally closed atmospheric valve for the chamber operable by the pressure responsive member toward the end of its power stroke to vent the chamber pressure to the atmosphere, a second valve operable by and during the venting operation to close the chamber supply port, and a spring interposed between the pressure responsive member and the two valves for being stressed by the responsive member to so move the two valves when the atmospheric valve has been initially unseated.

15. A windshield washer for motor vehicles, comprising a motor-pump unit having a liquid displacing member with an intake stroke and a delivery stroke, a spring biasing the liquid displacing member to move it throughout one stroke, said unit including power actuated means to move the liquid displacing member on its other stroke against the urge of the spring, a power interrupting device operable by the power actuated means during the other stroke of the liquid displacing member for interrupting the application of power to said means to enable the functioning of said spring, and a spring interposed between the power interrupting device and the power actuated means for being stressed to a device operating degree for so operating the device.

16. A washer for the windshields of motor vehicles, comprising a pump provided with a fluid displacing member having an intake stroke and a delivery stroke, a fluid pressure motor having a chamber and a pressure responsive member therein with a power stroke and a return stroke, a power spring biased by the responsive member during its power stroke for storing up energy for subsequent expenditure in effecting one stroke of the displacing member, said responsive member being operatively connected to the displacing member and operating on the power stroke to move the displacing member on its other stroke against the urge of said power spring, said chamber having a pressure supply port, a normally closed atmospheric valve for the chamber operable by the pressure responsive member toward the end of its power stroke to vent the chamber pressure to the atmosphere, a second valve operable by and during the venting operation to close the chamber supply port, a spring interposed between the pressure responsive member and the two valves for being stressed by the responsive member to so move the two valves when the atmospheric valve has been initially unseated, and a manually operated valve normally venting the pressure chamber to the atmosphere through the pressure supply port and operable to connect the latter to a pressure supply.

17. A windshield washer comprising a pump chamber with a self-returning fluid displacing member therein and a motor chamber with a power member therein connected to the fluid displacing member, said motor chamber being provided with a pressure supply port connectible to a source of negative pressure for actuating the power member, a normally open valve for closing said port movable to a port closing position by said power member to close off the pressure supply, normally closed valve means for venting the motor chamber to the atmosphere by and upon the closing of said valve, a control valve interposed in the communication between the pump unit and the source of pressure for controlling the communication with the latter and for venting the motor chamber when the communication is interrupted, and resilient means yieldably holding the control valve in its chamber venting position.

18. A windshield washer comprising a pump chamber with a self-returning fluid displacing member therein and a motor chamber with a power member therein connected to the fluid displacing member, said motor chamber being provided with a pressure supply port connectible to a source of negative pressure for actuating the power member, a normally open valve for said port movable to a port closing position by said power member to close off the pressure supply, normally closed valve means for venting the motor chamber to the atmosphere by and upon the closing of said valve, and a control valve interposed in the communication between the pump unit and the source of pressure for controlling the pressure communication with the latter and for venting the motor chamber when the communication is interrupted.

19. A windshield washer for motor vehicles, comprising a combined motor and pump unit with a liquid displacing member having one stroke for intaking a charge of liquid and a second stroke for delivering the liquid, said liquid displacing member having a motor part operable in actuating the pump on both strokes, a motor control operable to apply power for moving said motor part to effect one stroke of the liquid displacing member, a second motor operable independently of the motor control and serving to actuate the liquid displacing member on its other stroke, and a power interrupting device operable by the motor part at the end of its effected stroke to free the second motor for functioning to impart said other stroke.

ANTON RAPPL.

References Cited in the file of this patent

UNITED STATES PATENTS

| Number | Name | Date |
|---|---|---|
| 1,920,146 | Hueber | July 25, 1933 |
| 1,949,098 | Becker | Feb. 27, 1934 |
| 2,079,858 | Horton | May 11, 1937 |
| 2,114,558 | Dismukes | Apr. 19, 1938 |
| 2,142,056 | Horton | Dec. 27, 1938 |
| 2,162,985 | West | June 20, 1939 |
| 2,260,904 | Horton | Oct. 28, 1941 |
| 2,289,650 | Horton | July 14, 1942 |
| 2,540,290 | Rappl et al. | Feb. 6, 1951 |

FOREIGN PATENTS

| Number | Country | Date |
|---|---|---|
| 552,523 | France | May 2, 1923 |